United States Patent
Kim et al.

(10) Patent No.: US 9,665,208 B2
(45) Date of Patent: May 30, 2017

(54) DISPLAY DEVICE AND METHOD FOR DRIVING THE SAME

(71) Applicant: LG Display Co., Ltd., Seoul (KR)

(72) Inventors: Sunyeop Kim, Seoul (KR); Hui Kim, Seoul (KR); Kiltae Kim, Paju-si (KR); Hyunsuk Cho, Gwangmyeong-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/982,868

(22) Filed: Dec. 29, 2015

(65) Prior Publication Data

US 2017/0090643 A1 Mar. 30, 2017

(30) Foreign Application Priority Data

Sep. 30, 2015 (KR) .......................... 10-2015-0138261

(51) Int. Cl.
  *G06F 3/041* (2006.01)
  *G09G 3/36* (2006.01)
(52) U.S. Cl.
  CPC .......... *G06F 3/0416* (2013.01); *G06F 3/0412* (2013.01); *G09G 3/3696* (2013.01); *G09G 2300/0421* (2013.01)
(58) Field of Classification Search
  CPC ...... G06F 3/0416; G06F 3/0412; G06F 3/044; G06F 2203/04107; G06F 5/01; G09G 2310/0283; G09G 2310/0286; G11C 19/00
  See application file for complete search history.

(56) References Cited

U.S. PATENT DOCUMENTS

| 9,164,606 B2 * | 10/2015 | Krah ........................ G06F 3/041 |
| 2012/0162133 A1 | 6/2012 | Chen et al. |
| 2012/0262406 A1 | 10/2012 | Hotelling et al. |
| 2013/0076648 A1 | 3/2013 | Krah et al. |
| 2014/0210779 A1 | 7/2014 | Katsuta et al. |

(Continued)

FOREIGN PATENT DOCUMENTS

| JP | 2013-257908 A | 12/2013 |
| TW | 201239844 A | 10/2012 |
| TW | I474310 B | 2/2015 |

OTHER PUBLICATIONS

European Extended Search Report, European Application No. 15202916.1, Dec. 14, 2016, 8 pages.

(Continued)

*Primary Examiner* — Dorothy Harris
*Assistant Examiner* — Sardis F Azongha
(74) *Attorney, Agent, or Firm* — Fenwick & West LLP

(57) ABSTRACT

A display device and a method for driving the same are disclosed. The display device includes a display panel including pixels and touch sensors, the display panel being time-division driven in a display driving period and a touch sensor driving period, a main power integrated circuit (IC) configured to produce a first gate high voltage and a second gate high voltage less than the first gate high voltage, a touch power IC configured to produce a first AC signal having an amplitude corresponding to the second gate high voltage, and a gate driver configured to produce a gate pulse based on the first gate high voltage to supply the gate pulse to gate lines connected to the pixels during the display driving period and supply the first AC signal to the gate lines during the touch sensor driving period.

15 Claims, 11 Drawing Sheets

(56) References Cited

U.S. PATENT DOCUMENTS

| | | | |
|---|---|---|---|
| 2014/0218331 A1* | 8/2014 | Chang | G06F 3/044 345/174 |
| 2015/0091843 A1* | 4/2015 | Ludden | G06F 3/044 345/174 |
| 2015/0220208 A1* | 8/2015 | Noguchi | G06F 3/0412 345/174 |

OTHER PUBLICATIONS

Taiwan Office Action, Taiwan Application No. 104144391, Mar. 8, 2017, 11 pages.

\* cited by examiner (a)

(b)

DISPLAY DEVICE AND METHOD FOR DRIVING THE SAME

CROSS REFERENCE TO RELATED APPLICATIONS

This application claims the benefit of Republic of Korea Patent Application No. 10-2015-0138261 filed on Sep. 30, 2015, which is incorporated herein by reference for all purposes as if fully set forth herein.

BACKGROUND

Field

The present disclosure relates to a display device, in which touch sensors are embedded in a pixel array, and a method for driving the same.

Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

The touch UI has been essentially adopted in portable information devices, such as smart phones, and expanded to notebook computers, computer monitors, and home appliances. A technology (hereinafter referred to as "in-cell touch sensor technology") has been recently proposed to embed touch sensors in a pixel array of a display panel. In the in-cell touch sensor technology, the touch sensors may be installed in the display panel without an increase in a thickness of the display panel. The touch sensors are connected to pixels through parasitic capacitances. In order to reduce a mutual influence attributable to coupling between the pixels and the touch sensors, one frame period may be time-divided into a period (hereinafter referred to as "display driving period"), in which the pixels are driven, and a period (hereinafter referred to as a "touch sensor driving period"), in which the touch sensors are driven.

In the in-cell touch sensor technology, electrodes connected to the pixels of the display panel are used as electrodes of the touch sensors. For example, in the in-cell touch sensor technology, a common electrode supplying a common voltage to pixels of a liquid crystal display is segmented, and segmented common electrode patterns are used as the electrodes of the touch sensors.

A parasitic capacitance connected to the in-cell touch sensors increases due to coupling between the in-cell touch sensors and the pixels. If the parasitic capacitance increases, touch sensitivity and accuracy of touch recognition may be deteriorated. A load free driving method is used to reduce an influence of the parasitic capacitance on the touch sensing.

The load free driving method supplies an AC (alternating current) signal having the same phase and the same amplitude as a touch driving signal to data lines and gate lines of the display panel during the touch sensor driving period, thereby reducing the influence of the parasitic capacitance of the touch sensor on the touch sensing. More specifically, the load free driving method supplies a data voltage of an input image to the data lines and also supplies a gate pulse synchronized with the data voltage to the gate lines during the display driving period, and supplies the AC signal synchronized with the touch driving signal to the data lines and the gate lines during the touch sensor driving period.

In the load free driving method, because the touch driving signal and the AC signal having the same phase and the same amplitude are applied to both ends (the touch sensor and the signal lines) of the parasitic capacitance, the influence of the parasitic capacitance may be excluded. This is because voltages at both ends of the parasitic capacitance simultaneously change, and an amount of charges charged to the parasitic capacitance decreases as a voltage difference between both ends of the parasitic capacitance decreases. According to the load free driving method, an amount of charges charged to the parasitic capacitance is theoretically zero. Therefore, a load free effect not having the parasitic capacitance may be obtained.

The load free effect may be obtained when the touch driving signal and the AC signal have completely the same phase and the same amplitude.

In the load free driving method, the touch sensitivity and the accuracy of touch recognition may be improved as the amplitude of the touch driving signal increases. However, there is a limit to an increase in the amplitude of the touch driving signal due to a specification of a gate driver integrated circuit (IC).

SUMMARY

The present disclosure provides a display device and a method for driving the same capable of improving touch sensitivity and accuracy of touch recognition by increasing an amplitude of a touch driving signal.

In one aspect, there is a display device comprising a display panel including pixels and touch sensors, the display panel being time-division driven in a display driving period and a touch sensor driving period, a main power integrated circuit (IC) configured to produce a first gate high voltage and a second gate high voltage less than the first gate high voltage, a touch power IC configured to produce a first AC (alternating current) signal having an amplitude corresponding to the second gate high voltage, and a gate driver configured to produce a gate pulse based on the first gate high voltage to supply the gate pulse to gate lines connected to the pixels during the display driving period and supply the first AC signal to the gate lines during the touch sensor driving period.

During the touch sensor driving period, a touch driving signal having the same phase and the same amplitude as the first AC signal is supplied to the touch sensors, and a second AC signal having the same phase and the same amplitude as the first AC signal is supplied to data lines connected to the pixels.

An amplitude of the first AC signal has a voltage margin proportional to a difference between the first gate high voltage and the second gate high voltage.

The display device further comprises a timing controller configured to analyze an input image and produce a power control signal depending on an attribute of the input image. The main power IC controls the second gate high voltage in response to the power control signal.

The display device further comprises a pulse width modulation (PWM) generator configured to output first to third PWM signals. The first to third PWM signals have the same phase.

The touch power IC produces the touch driving signal having an amplitude corresponding to the second gate high voltage based on the first PWM signal, or produces the first AC signal having an amplitude corresponding to the second gate high voltage based on the second PWM signal, or produces the second AC signal having an amplitude corresponding to the second gate high voltage based on the third PWM signal.

The touch power IC level-shifts the first PWM signal based on a common voltage to produce the touch driving signal, level-shifts the second PWM signal based on the common voltage to produce the first AC signal, and level-shifts the third PWM signal based on a gate low voltage to produce the second AC signal.

In another aspect, there is a method for driving a display device including a display panel including pixels and touch sensors, the display panel being time-division driven in a display driving period and a touch sensor driving period, the method comprising producing a first gate high voltage and producing a second gate high voltage less than the first gate high voltage, producing a first AC (alternating current) signal having an amplitude corresponding to the second gate high voltage, and producing a gate pulse based on the first gate high voltage to supply the gate pulse to gate lines connected to the pixels during the display driving period and supplying the first AC signal to the gate lines during the touch sensor driving period.

The method further comprises supplying a touch driving signal having the same phase and the same amplitude as the first AC signal to the touch sensors during the touch sensor driving period, and supplying a second AC signal having the same phase and the same amplitude as the first AC signal to data lines connected to the pixels during the touch sensor driving period.

An amplitude of the first AC signal has a voltage margin proportional to a difference between the first gate high voltage and the second gate high voltage.

The method further comprises analyzing an input image and producing a power control signal depending on an attribute of the input image.

The producing of the second gate high voltage includes controlling the second gate high voltage in response to the power control signal.

In one embodiment, a display device comprises a display panel. The display panel includes one or more pixels, touch sensors, and a gate line connected to the one or more pixels. The display panel is driven in a display driving period and a touch sensor driving period. The display panel can include driving circuitry to drive the display panel. A gate driver of the driving circuitry generates a gate pulse based on a gate high voltage and to supply the gate pulse to the gate line. A power circuit of the driving circuitry generates the gate high voltage. The power circuit generates the gate high voltage to have a first voltage level during the display driving period and to have a second voltage level lower than the first voltage level during the touch sensor driving period.

In one embodiment, a touch power circuit of the driving circuitry produces a first AC (alternating current) signal having an amplitude corresponding to the second voltage level of the gate high voltage. The gate driver supplies the gate pulse to the gate line during the display driving period and supplies the first AC signal to the gate line during the touch sensor driving period.

In one embodiment, during the touch sensor driving period, a touch driving signal having the same phase and the same amplitude as the first AC signal is supplied to the touch sensors. A second AC signal having the same phase and the same amplitude as the first AC signal is supplied to data lines connected to the pixels.

In one embodiment, a pulse width modulation (PWM) generator is configured to output first, second and third PWM signals having a same phase. The touch power circuit produces the touch driving signal having an amplitude corresponding to the second voltage level of the gate high voltage based on the first PWM signal, produces the first AC signal having an amplitude corresponding to the second voltage level of the gate high voltage based on the second PWM signal, and produces the second AC signal having an amplitude corresponding to the second voltage level of the gate high voltage based on the third PWM signal.

In one embodiment, the touch power circuit level-shifts the first PWM signal based on a common voltage to produce the touch driving signal, level-shifts the second PWM signal based on the common voltage to produce the first AC signal, and level-shifts the third PWM signal based on a gate low voltage to produce the second AC signal.

In one embodiment, an amplitude of the first AC signal has a voltage margin proportional to a difference between the first voltage level and the second voltage level of the gate high voltage.

In one embodiment, the display device includes a timing controller configured to analyze an input image and produce a power control signal depending on an attribute of the input image. The power circuit controls the second voltage level of the gate high voltage in response to the power control signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
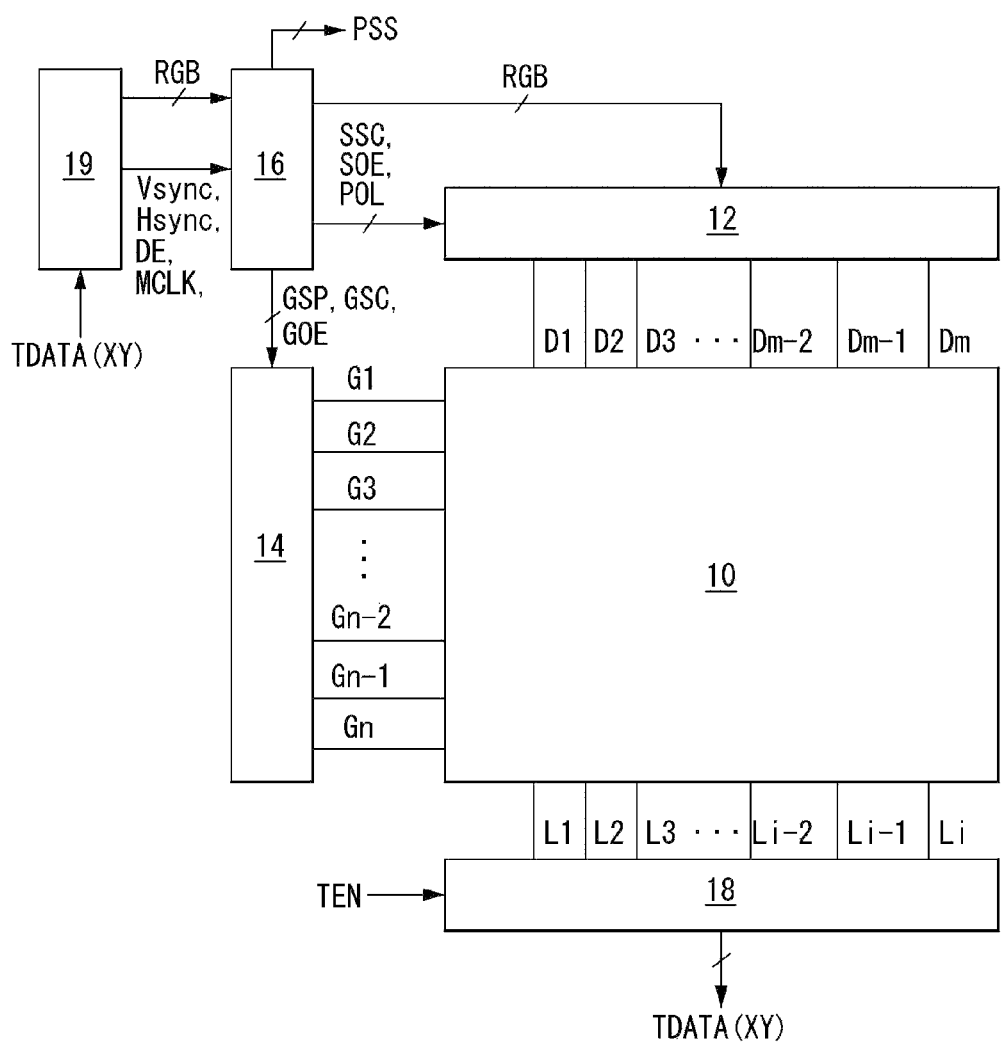
FIG. 1 shows a display device according to an exemplary embodiment of the invention.

Reference will now be made in detail to embodiments of the invention, examples of which are illustrated in the accompanying drawings. Wherever possible, the same reference numbers will be used throughout the drawings to refer to the same or like parts. Detailed description of known arts will be omitted if it is determined that the arts can mislead the embodiments of the invention.

FIGS. 1 to 6 show a display device according to an exemplary embodiment of the invention.

Referring to FIGS. 1 to 6, a display device according to the embodiment of the invention may be implemented based on a flat panel display, such as a liquid crystal display (LCD), a field emission display (FED), a plasma display panel (PDP), an organic light emitting diode display, and an electrophoresis display (EPD). In the following description, the embodiment of the invention will be described using the liquid crystal display as an example of the flat panel display. Other flat panel displays may be used.

The display device includes a display module and a touch module.

The display module may include a display panel 10, a display driver, a timing controller 16, and a host system 19.

The display panel 10 includes a liquid crystal layer formed between an upper substrate and a lower substrate. The pixel array of the display panel 10 includes pixels 101 formed in pixel areas defined by the data lines D1 to Dm and the gate lines G1 to Gn, where m and n are a positive integer. Each pixel 101 includes thin film transistors (TFTs) formed at crossings of the data lines D1 to Dm and the gate lines G1 to Gn, a pixel electrode charged to a data voltage, a storage capacitor which is connected to the pixel electrode and holds a voltage of a liquid crystal cell, and the like.

Black matrixes, color filters, etc. may be formed on the upper substrate of the display panel 10. The lower substrate of the display panel 10 may be configured in a COT (color filter on TFT) structure. In this instance, the black matrixes and the color filters may be formed on the lower substrate of the display panel 10. A common electrode, to which the common voltage Vcom is supplied, may be formed on the upper substrate or the lower substrate of the display panel 10. Polarizing plates are respectively attached to the upper substrate and the lower substrate of the display panel 10. Alignment layers for setting a pre-tilt angle of liquid crystals are respectively formed on the inner surfaces contacting the liquid crystals in the upper substrate and the lower substrate of the display panel 10. A column spacer is formed between the upper substrate and the lower substrate of the display panel 10 to keep cell gaps of the liquid crystal cells constant.

A backlight unit may be disposed under a back surface of the display panel 10. The backlight unit may be implemented as one of an edge type backlight unit and a direct type backlight unit and irradiates light onto the display panel 10. The display panel 10 may be implemented in any known mode including a twisted nematic (TN) mode, a vertical alignment (VA) mode, an in-plane switching (IPS) mode, a fringe field switching (FFS) mode, etc.

The display driver includes a data driver 12 and a gate driver 14. The display driver applies input image data RGB to the pixels 101 of the display panel 10 under the control of the timing controller 16. The data driver 12 converts the input image data RGB received from the timing controller 16 into positive and negative analog gamma compensation voltages and outputs a data voltage. The data driver 12 then supplies the data voltage to the data lines D1 to Dm. The gate driver 14 sequentially supplies a gate pulse (or a scan pulse) synchronized with the data voltage to the gate lines G1 to Gn and selects pixel lines of the display panel 10 to which the data voltage is applied.

The timing controller 16 receives timing signals, such as a vertical sync signal Vsync, a horizontal sync signal Hsync, a data enable signal DE, and a main clock MCLK, from the host system 19. The timing controller 16 synchronizes operation timings of the data driver 12 and the gate driver 14 with each other. The timing controller 16 generates a data timing control signal and a scan timing control signal for respectively controlling the operation timings of the data driver 12 and the gate driver 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, and the like. The timing controller 16 analyzes an input image and produces a power control signal PSS depending on an attribute of the input image.

The host system 19 transmits the input image data RGB and the timing signals Vsync, Hsync, DE, and MCLK to the timing controller 16. Further, the host system 19 may execute an application associated with touch coordinate information TDATA(XY) received from a touch driving device 18.

The touch module includes touch sensors TS1 to TS4 and the touch driving device 18 driving the touch sensors TS1 to TS4.

The touch sensors TS1 to TS4 may be implemented as capacitive sensors sensing a touch input through a capacitive manner. The touch sensors TS1 to TS4 each have a capacitance. The capacitance may be divided into a self-capacitance and a mutual capacitance. The self-capacitance may be formed along a conductor line of a single layer formed in one direction, and the mutual capacitance may be formed between two conductor lines perpendicular to each other.

Figure 2:
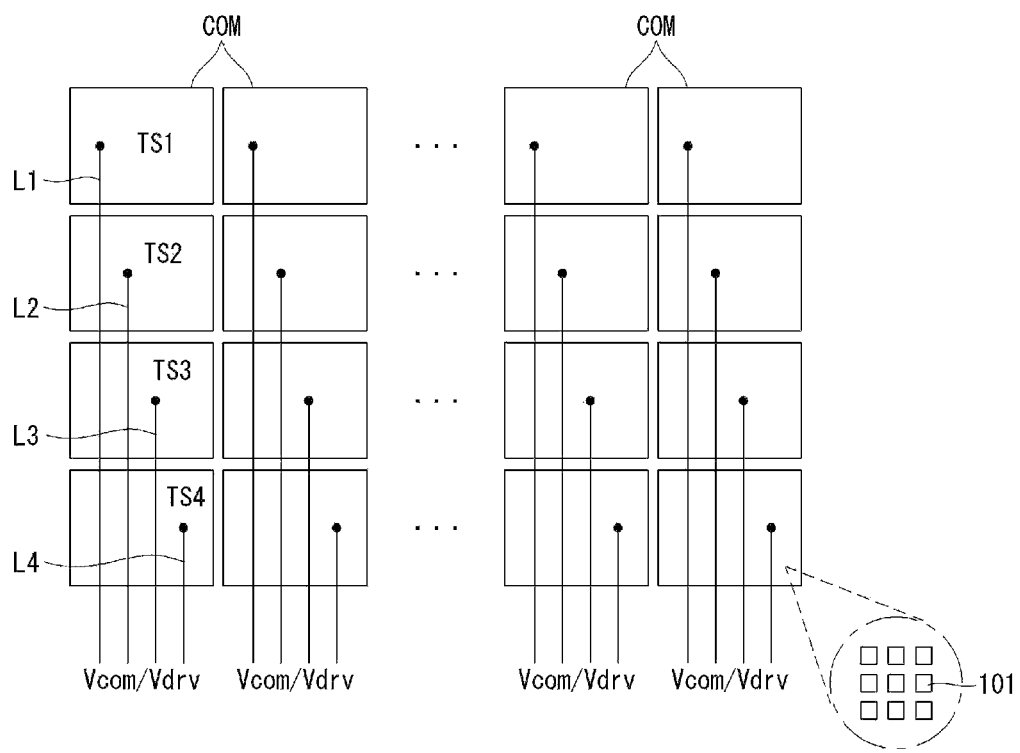
FIG. 2 shows an example of a touch sensor embedded in a pixel array.

The touch sensors TS1 to TS4 may be embedded in the pixel array of the display panel 10. Referring to FIG. 2, the pixel array of the display panel 10 includes the touch sensors TS1 to TS4 and sensor lines L1 to Li connected to the touch sensors TS1 to TS4, where "i" is a positive integer less than m and n. A common electrode COM of the pixels 101 is divided into a plurality of segments. The touch sensors TS1 to TS4 are implemented as the divided common electrodes COM. One common electrode segment is commonly connected to the plurality of pixels 101 and forms one touch sensor. The touch sensors TS1 to TS4 supply a common voltage Vcom to the pixels 101 during a display driving period Td. During a touch sensor driving period Tt, the touch sensors TS1 to TS4 receive a touch driving signal Vdrv and sense a touch input. FIG. 2 shows the self-capacitance touch sensors, as an example. Other types of touch sensors may be used for the touch sensors TS1 to TS4.

The touch driving device 18 senses a change in charges of the touch sensors TS1 to TS4 before and after a touch operation and determines whether or not the touch operation using a conductive material, for example, a finger (or a stylus pen) is performed and a location of the touch operation. The touch driving device 18 analyzes the change in the charges of the touch sensors TS1 to TS4, determines whether or not the touch input is received, and calculates coordinates of a location of the touch input. The coordinate information TDATA(XY) of the location of the touch input is transmitted to the host system 19.

Figure 3:
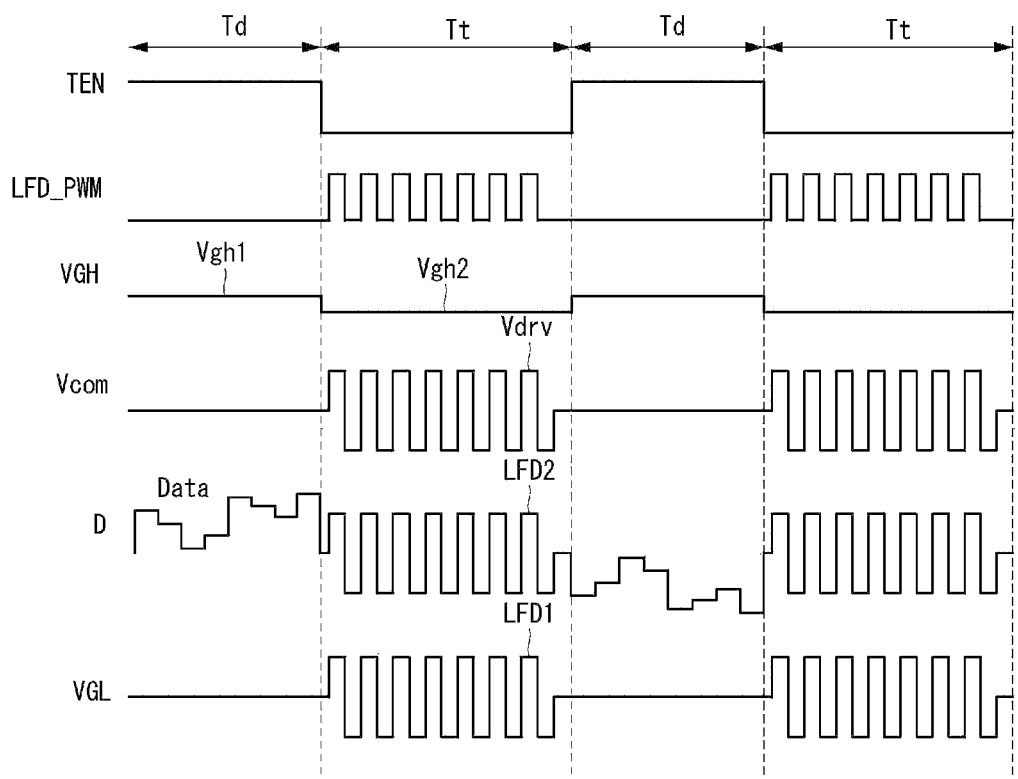
FIG. 3 is a waveform diagram showing a touch driving signal and AC signals supplied to a touch sensor, a data line, and a gate line in a display driving period and a touch sensor driving period in a time-division drive according to an exemplary embodiment of the invention.

The display device according to the embodiment of the invention time-divides one frame period into a period, in which a touch input is sensed, and a period, in which input image data is applied. For this, as shown in FIG. 3, the timing controller 16 may time-divide one frame period into a touch sensor driving period Tt, in which the touch input is sensed, and a display driving period Td, in which the input image data is applied, based on a touch enable signal TEN. FIG. 3 shows that one frame period is time-divided into the touch sensor driving period Tt and the display driving period Td, as an example. The embodiment of the invention is not limited thereto. For example, one frame period may be time-divided into at least one touch sensor driving period Tt and at least one display driving period Td.

During the display driving period Td, the data driver 12 supplies the data voltage to the data lines D1 to Dm under the control of the timing controller 16, and the gate driver 14 sequentially supplies the gate pulse synchronized with the data voltage to the gate lines G1 to Gn under the control of the timing controller 16. During the display driving period Td, the gate driver 14 produces the gate pulse based on a first gate high voltage Vgh1 and supplies the gate pulse to the gate lines G1 to Gn connected to the pixels. During the touch sensor driving period Tt, the gate driver 14 supplies a first AC signal to the gate lines G1 to Gn. During the display driving period Td, the touch driving device 18 stops a touch sensing operation.

During the touch sensor driving period Tt, the touch driving device 18 drives the touch sensors TS1 to TS4. The touch driving device 18 supplies the touch driving signal Vdrv to the touch sensors TS1 to TS4 through the sensor lines L1 to Li and senses a touch input.

During the touch sensor driving period Tt, the display driver (12, 14) supplies first and second AC signals LFD1 and LFD2 synchronized with the touch driving signal Vdrv to the signal lines D1 to Dm and G1 to Gn connected to the pixels 101, thereby minimizing parasitic capacitances between the signal lines D1 to Dm and G1 to Gn connected to the pixels 101 and the touch sensors TS1 to TS4.

The first AC signal LFD1 is changed to have an amplitude corresponding to a second gate high voltage Vgh2. A touch power integrated circuit (IC) produces the first AC signal LFD1 having the amplitude corresponding to the second gate high voltage Vgh2 during the touch sensor driving period Tt. As the first AC signal LFD1 is changed to have the amplitude corresponding to the second gate high voltage Vgh2, the second AC signal LFD2 and the touch driving signal Vdrv may be changed to have the same phase and the same amplitude as the first AC signal LFD1. This is described in detail later.

As shown in FIG. 3, a touch sensor driver RIC supplies the touch driving signal Vdrv to the touch sensors TS1 to TS during the touch sensor driving period Tt. The display driver (12, 14) supplies the first AC signal LFD1 to the gate lines G1 to Gn and supplies the second AC signal LFD2 to the data lines D1 to Dm during the touch sensor driving period Tt. Namely, during the touch sensor driving period Tt for sensing the touch input, the touch sensor driver RIC supplies the touch driving signal Vdrv to the touch sensors TS1 to TS, supplies the first AC signal LFD1 having the same phase and the same amplitude as the touch driving signal Vdrv to the gate lines G1 to Gn connected to the pixels 101, and supplies the second AC signal LFD2 having the same phase and the same amplitude as the touch driving signal Vdrv to the data lines D1 to Dm connected to the pixels 101.

Figure 5:
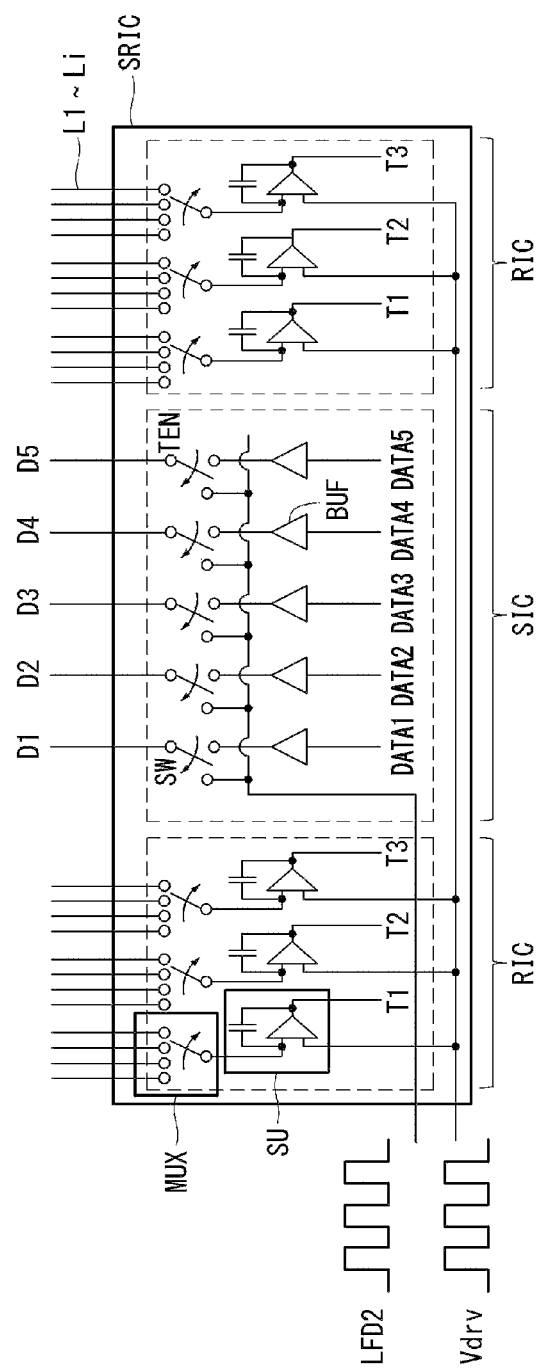
FIG. 5 shows internal configuration of SRIC shown in FIG. 4.

Referring to FIG. 5, the touch sensor driver RIC may include a multiplexer MUX and a sensing unit SU. Although not shown, the multiplexer MUX selects touch sensors TS accessed by the sensing unit SU under the control of a microcontroller unit (MCU) and then supplies the touch driving signal Vdrv to the selected touch sensors TS.

The sensing unit SU is connected to the sensor lines L1 to Li through the multiplexer MUX, measures a change in a waveform of a voltage received from the touch sensors TS, and converts the change into digital data. The sensing unit SU includes an amplifier amplifying the received voltages of the touch sensors TS, an integrator accumulating the amplified voltages of the amplifier, and an analog-to-digital converter (ADC) converting a voltage of the integrator into digital data. The digital data output from the ADC is touch raw data and is transmitted to the MCU.

Figure 4:
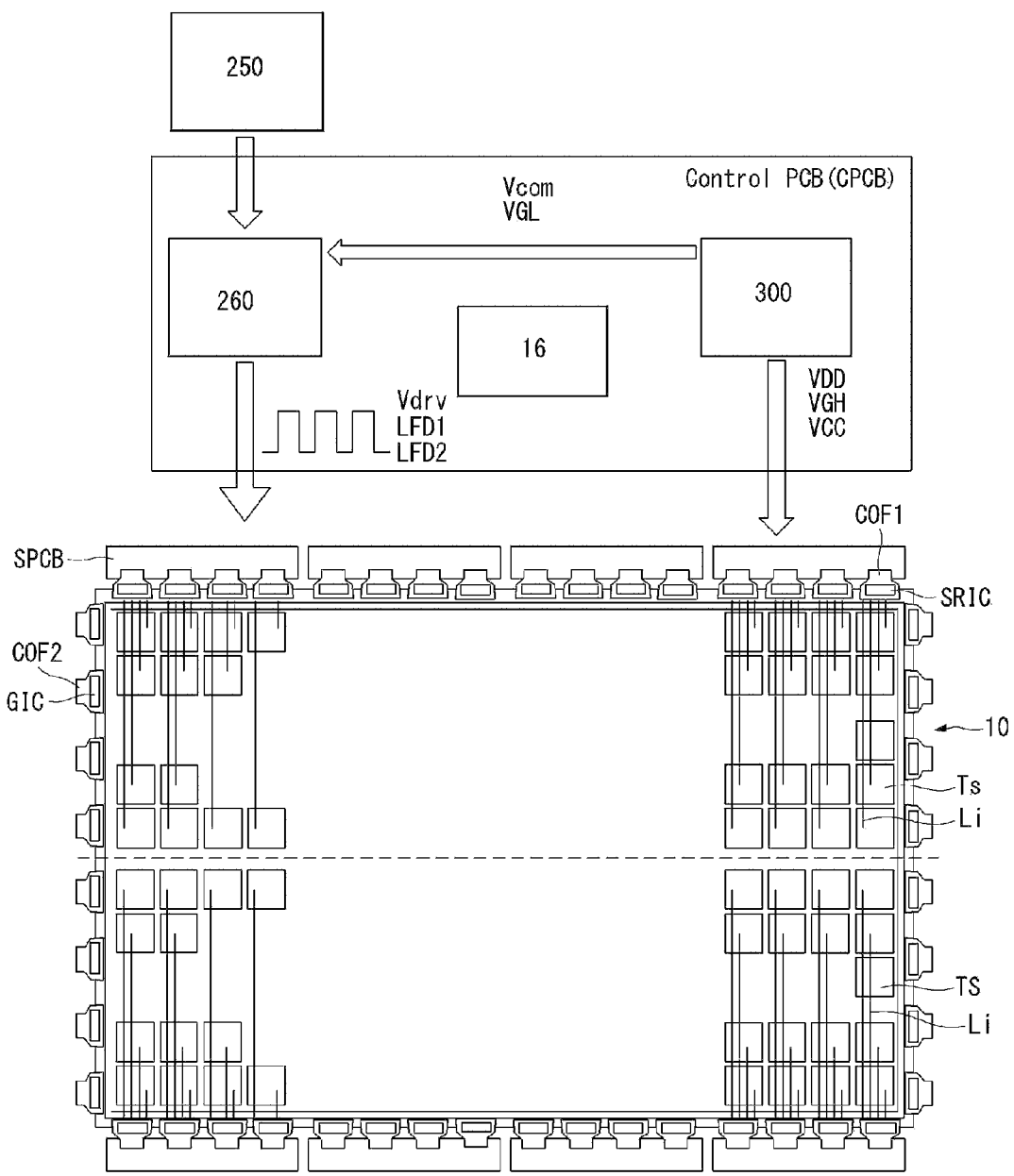
FIG. 4 shows a connection relationship of a display panel, a timing controller, a touch driving device, and a display driver according to an exemplary embodiment of the invention.
Figure 6:
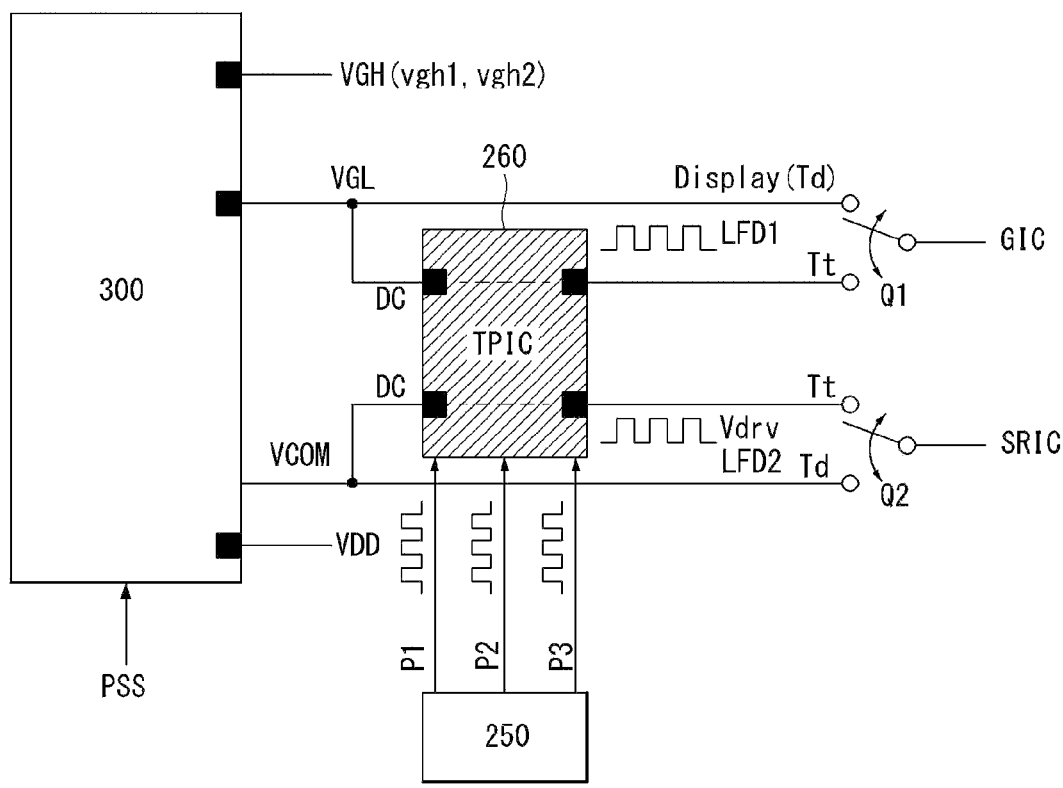
FIG. 6 illustrates an operation of each of a main power IC, TPIC, and a PWM generator according to an exemplary embodiment of the invention.

FIG. 4 shows a connection relationship of the display panel 10, the timing controller 16, the touch driving device 18, and the display driver (12, 14). FIG. 5 shows internal configuration of SRIC shown in FIG. 4. FIG. 6 illustrates an operation of each of a main power IC, TPIC, and a pulse width modulation (PWM) generator according to the embodiment of the invention.

Referring to FIGS. 4 to 6, the touch driving device 18 may include the timing controller 16 mounted on a control printed circuit board (PCB) CPCB, a touch power IC 260 (or TPIC), and a main power IC 300 (or PMIC). The touch driving device 18 may further include a PWM generator 250. The PWM generator 250 may be mounted on the control PCB CPCB.

The control PCB CPCB may be electrically connected to a source PCB SPCB through a cable. The source PCB SPCB and the display panel 10 may be electrically connected to each other through a first COF (chip-on film) COF1. The control PCB CPCB may be integrated into the source PCB SPCB when the small-sized display device is used.

A source driver IC SIC implementing the data driver 12 and the touch sensor driver RIC are integrated to form SRIC. The SRIC is mounted on the first COF COF1.

A gate driver IC GIC implementing the gate driver 14 is mounted on a second COF COF2. The second COF COF2 is attached to the display panel 10.

The first COF COF1 and the second COF COF2 may be formed in the form of COG (chip-on glass) when the small-sized display device is used.

The touch sensor driver RIC includes the multiplexer MUX and the sensing unit SU. During the touch sensor driving period Tt, the touch sensor driver RIC supplies the touch driving signal Vdrv received from the touch power IC 260 to the selected touch sensors TS, accumulates charges received from the selected touch sensors TS, and outputs touch raw data T1 to T3. During the display driving period Td, the connection between the sensor lines L1 to Li and the multiplexer MUX is released, and the sensor lines L1 to Li are connected to a common voltage input terminal (not shown). Thus, the common voltage is supplied to the touch sensors TS during the display driving period Td.

The source driver IC SIC includes output control switches SW, which are turned on or off in response to the touch enable signal TEN. During the touch sensor driving period Tt, the output control switches SW connect the touch power IC 260 outputting the second AC signal LFD2 to the data lines D1 to D5 and cause the second AC signal LFD2 to be supplied to the data lines D1 to D5.

During the display driving period Td, the output control switches SW connect output buffers BUF outputting data voltages DATA1 to DATA5 to the data lines D1 to D5 and cause the data voltages DATA1 to DATA5 to be supplied to the data lines D1 to D5.

During the touch sensor driving period Tt, the gate driver IC GIC connects the touch power IC 260 producing the first AC signal LFD1 having the amplitude corresponding to the second gate high voltage Vgh2 to the gate lines G1 to Gn and causes the first AC signal LFD1 to be supplied to the gate lines G1 to Gn. The gate driver IC GIC and the touch power IC 260 are connected to each other through the first COF COF1, LOG (line-on glass) lines, the second COF COF2, etc. The LOG lines are signal lines disposed on a display substrate of the display panel 10. The electrical connection between the gate driver IC GIC and the touch power IC 260 is released during the display driving period Td.

The PWM generator 250 outputs a first PWM signal P1, a second PWM signal P2, and a third PWM signal P3 having the same phase.

The touch power IC 260 produces the touch driving signal Vdrv having the amplitude corresponding to the second gate high voltage Vgh2 based on the first PWM signal P1, the first AC signal LFD1 having the amplitude corresponding to the second gate high voltage Vgh2 based on the second PWM signal P2, and the second AC signal LFD2 having the amplitude corresponding to the second gate high voltage Vgh2 based on the third PWM signal P3. In one embodiment, the amplitude of Vdrv/LFD1/LFD2 corresponds to the second gate high voltage Vgh2 because the amplitude varies as the voltage level of the second gate high voltage Vgh2 varies.

As shown in FIG. 6, the touch power IC 260 receives a gate low voltage VGL of a DC level and the common voltage Vcom from the main power IC 300. The gate low voltage VGL is a voltage capable of turning off the TFTs included in the display panel 10. The touch power IC 260 level-shifts the first PWM signal P1 received from the PWM generator 250 based on the common voltage Vcom and produces the touch driving signal Vdrv. The touch power IC 260 level-shifts the second PWM signal P2 received from the PWM generator 250 based on the common voltage Vcom and produces the first AC signal LFD1. The touch power IC 260 level-shifts the third PWM signal P3 received from the PWM generator 250 based on the gate low voltage VGL and produces the second AC signal LFD2. The touch power IC 260 causes the touch driving signal Vdrv, the first AC signal LFD1, and the second AC signal LFD2 to have the same amplitude as the amplitude corresponding to the second gate high voltage Vgh2.

So far, the embodiment of the invention described that the touch power IC 260 receives the first to third PWM signals P1 to P3 from the PWM generator 250, level-shifts the first to third PWM signals P1 to P3, and causes the touch driving signal Vdrv, the first AC signal LFD1, and the second AC signal LFD2 to have the same amplitude. However, the embodiment of the invention is not limited thereto. For example, the touch power IC 260 may receive one of the first to third PWM signals P1 to P3 from the PWM generator 250, level-shift the received PWM signal, and produce the touch driving signal Vdrv, the first AC signal LFD1, and the second AC signal LFD2.

FIG. 6 shows that the gate low voltage VGL of the DC level is input to the touch power IC 260, as an example. The embodiment of the invention is not limited thereto. For example, the touch power IC 260 may receive the gate low voltage VGL, produce the gate pulse based on the first gate high voltage Vgh1 during the display driving period Td, and produce the first AC signal LFD1 having the amplitude corresponding to the second gate high voltage Vgh2 based on the second PWM signal P2 during the touch sensor driving period Tt.

FIG. 6 shows that the common voltage Vcom of the DC level is input to the touch power IC 260, as an example. The embodiment of the invention is not limited thereto. For example, the touch power IC 260 may receive the common voltage Vcom, produce the common voltage Vcom during the display driving period Td, produce the touch driving signal Vdrv having the amplitude corresponding to the second gate high voltage Vgh2 based on the first PWM signal P1 during the touch sensor driving period Tt, and produce the second AC signal LFD2 having the amplitude corresponding to the second gate high voltage Vgh2 based on the third PWM signal P3 during the touch sensor driving period Tt.

FIG. 6 shows that switches Q1 and Q2, which are turned on or off depending on the display driving period Td and the touch sensor driving period Tt, are not embedded in the touch power IC 260, as an example. The embodiment of the invention is not limited thereto. For example, the switches Q1 and Q2 may be embedded in the touch power IC 260.

The main power IC 300 produces the gate high supply voltage (which can be at a first gate high voltage level Vgh1 or a second gate high voltage level Vgh2), the gate low supply voltage VGL, the common voltage Vcom, a high potential driving voltage VDD, a high potential logic voltage VCC, and the like.

The main power IC 300 produces the first gate high voltage Vgh1 during the display driving period Td, in which the input image data is applied to the pixels 101. The first gate high voltage Vgh1 is a voltage capable of turning on the TFTs included in the display panel 10 during the display driving period Td. The main power IC 300 produces the second gate high voltage Vgh2 to be less than the first gate high voltage Vgh1 during the touch sensor driving period Tt, in which the touch input with respect to the touch sensors TS is sensed. In this instance, the main power IC 300 may control the second gate high voltage Vgh2 in response to the power control signal PSS, such as by adjusting the voltage level of the second gate high voltage Vgh2. The first gate high voltage Vgh1 and the gate low supply voltage VGL are voltages for producing the gate pulse applied to the gate lines. The high potential driving voltage VDD is a power voltage supplied to a gamma string included in the source driver IC SIC. The high potential logic voltage VCC is an operating voltage for operating internal logics of the source driver IC SIC, the SRIC, and the gate driver IC GIC.

The display device according to the embodiment of the invention is a touch sensor integrated type display device. The touch sensor integrated type display device may adopt a double feeding method illustrated in FIG. 4, so as to minimize a signal distortion attributable to an RC delay. According to the double feeding method, the data voltage is simultaneously supplied to the data lines D1 to Dm from first and second sides of the display panel 10 which are opposite to each other, and the gate pulse is simultaneously supplied to the gate lines G1 to Gn from third and fourth sides of the display panel 10 which are opposite to each other. The embodiment of the invention is not limited thereto.

Figure 7:
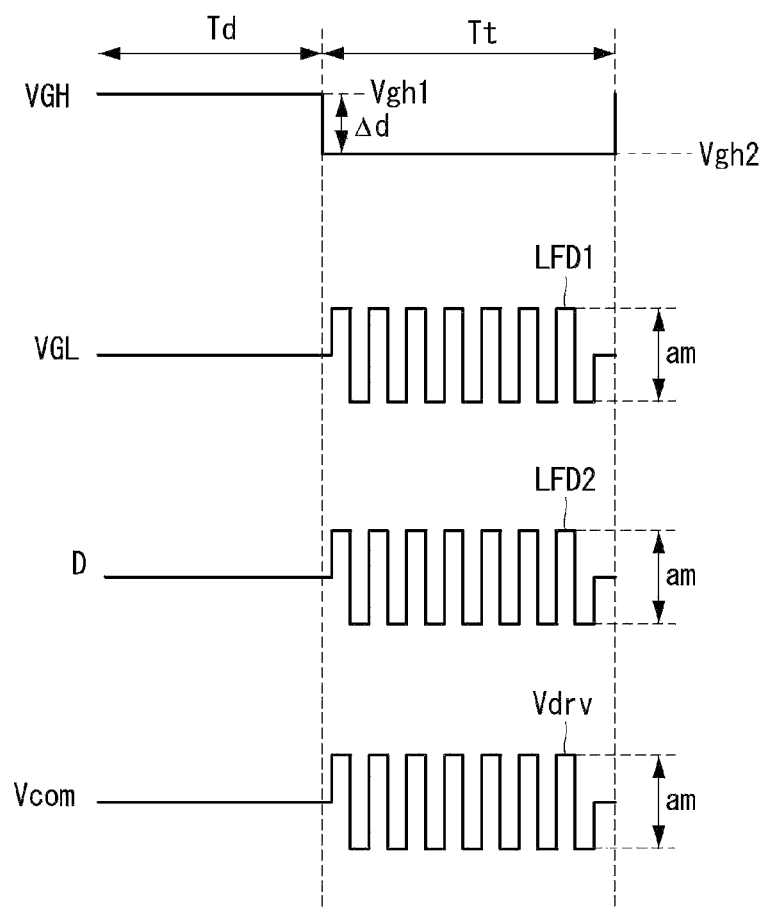
FIG. 7 is a waveform diagram showing an amplitude of a first AC signal depending on a difference between a first gate high voltage and a second gate high voltage.
Figure 8:
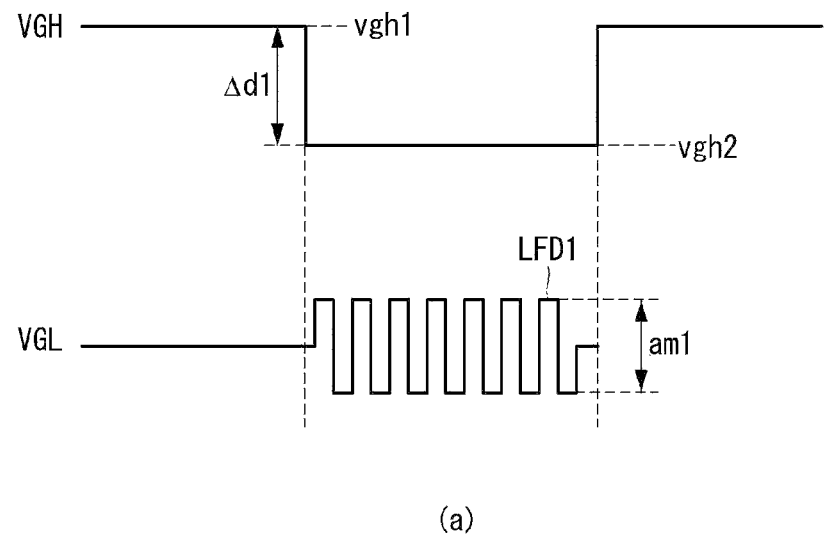
FIG. 8 is a waveform diagram showing a second gate high voltage controlled in response to a power control signal.
Figure 8:
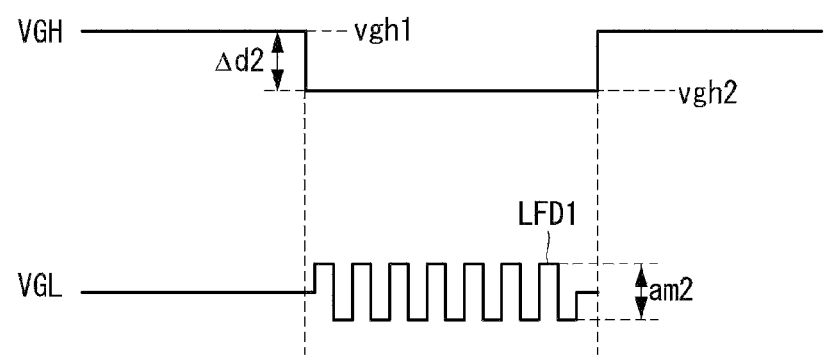

FIG. 7 is a waveform diagram showing an amplitude of the first AC signal depending on a difference between the first gate high voltage and the second gate high voltage. FIG. 8 is a waveform diagram showing the second gate high voltage controlled in response to the power control signal.

The gate driver IC GIC is driven within a predetermined driving voltage range. A voltage level range of the gate driver IC GIC may be limited so that it is driven within the predetermined driving voltage range. The voltage level range of the gate driver IC GIC is defined by a difference between the gate high supply voltage VGH and the gate low supply voltage VGL. If the predetermined driving voltage range of the gate driver IC GIC is 15 V to 40 V, the voltage level range of the gate driver IC GIC may be limited to a value less than 40 V.

For example, when the gate high supply voltage VGH is set to 30 V, the gate low voltage supply VGL is set to be less than −10 V, so that the gate driver IC GIC is driven within the voltage level range of 40 V. As described above, the voltage level range of the gate driver IC GIC may be limited so as to drive the gate driver IC GIC within the predetermined driving voltage range.

During the display driving period Td, the gate driver IC GIC sets the gate high supply voltage VGH as high as possible within its voltage level range and supplies the gate high supply voltage VGH to the gate lines G1 to Gn, thereby stably driving the display device. Because the gate driver IC GIC sets the gate high supply voltage VGH as high as possible within its voltage level range, there is a limit to a reduction in the gate low supply voltage VGL within the limited voltage level range. Hence, a low level of the first AC signal LFD1 supplied to the gate lines G1 to Gn during the touch sensor driving period Tt is limited. In order to solve this, the display device according to the embodiment of the invention, as shown in FIG. 7, produces the first gate high voltage Vgh1 during the display driving period Td, in which the input image data is applied to the pixels, and produces the second gate high voltage Vgh2 less than the first gate high voltage Vgh1 during the touch sensor driving period Tt, in which the touch input with respect to the touch sensors TS is sensed.

During the touch sensor driving period Tt, the second gate high voltage Vgh2 may be produced to be less than the first gate high voltage Vgh1 by Δd. Hence, the low level of the first AC signal LFD1 may be reduced by Δd. As a result, an amplitude 'am' of the first AC signal LFD1 may increase by two times the voltage Δd. Amplitude 'am' may refer to peak to peak amplitude.

For example, assuming that the predetermined driving voltage range of the gate driver IC GIC is set to 40 V, the first gate high voltage Vgh1 is set to 30 V, and the second gate high voltage Vgh2 is set to 28 V, a difference Δd between the first gate high voltage Vgh1 and the second gate high voltage Vgh2 is 2 V. Because the predetermined driving voltage range of the gate driver IC GIC is approximately 40 V, the voltage level range of the gate driver IC GIC may be shifted from (−10 V to 30 V) to (−12 V to 28 V). Hence, the low level of the first AC signal LFD1 may be reduced by −2 V. Because the low level of the first AC signal LFD1 is reduced by −2 V, a high level of the first AC signal LFD1 may further increase by 2 V. Thus, the amplitude 'am' corresponding to a swing amplitude of the first AC signal LFD1 may further increase by 4V. The amplitude 'am' of the first AC signal LFD1 may be proportional to the difference Δd between the first gate high voltage Vgh1 and the second gate high voltage Vgh2. In one embodiment, an amplitude of the first AC signal LFD1 has a voltage margin proportional to the difference Δd between the first gate high voltage Vgh1 and the second gate high voltage Vgh2.

Because the first AC signal LFD1 has the amplitude corresponding to the second gate high voltage Vgh2, the touch driving signal Vdrv and the second AC signal LFD2 each having the same phase and the same amplitude as the first AC signal LFD1 may be changed to the amplitude corresponding to the second gate high voltage Vgh2. During the touch sensor driving period Tt, the touch driving signal Vdrv having the same phase and the same amplitude as the first AC signal LFD1 is supplied to the touch sensors TS, and the second AC signal LFD2 having the same phase and the same amplitude as the first AC signal LFD1 is supplied to the data lines connected to the pixels.

As described above, the embodiment of the invention can increase the amplitude 'am' of the first AC signal LFD1 because the first AC signal LFD1 has the amplitude corresponding to the second gate high voltage Vgh2. Further, the touch driving signal Vdrv and the second AC signal LFD2 having the same phase and the same amplitude as the first AC signal LFD1 may be changed to an increase in the amplitude 'am' of the first AC signal LFD1. Consequently, the touch sensitivity and the accuracy of touch recognition of the display device according to the embodiment of the invention can be improved.

Referring to FIG. 8, the display device according to the embodiment of the invention may produce the second gate high voltage Vgh2 less than the first gate high voltage Vgh1 during the touch sensor driving period Tt and may analyze the input image to produce the power control signal PSS depending on an attribute of the input image during the display driving period Td. The image attribute analyzes the displayed image and adjusts and compensates a driving voltage when a noise increases during a drive.

In FIG. 8, (a) shows the second gate high voltage Vgh2 controlled in response to the power control signal PSS when a touch noise increases due to an image output during the display driving period Td.

A ripple of the common voltage Vcom may exist during specific images, such as images in which the data voltage changes greatly during the display driving period Td. Hence, a touch noise may increase, and the touch sensitivity and the accuracy of touch recognition may be reduced. The driving voltage of a relatively high level has to be supplied to the signal lines, so as to increase the touch sensitivity and the accuracy of touch recognition.

Although the embodiment of the invention uses a load free driving method, in which the display driving period Td and the touch sensor driving period Tt are dividedly driven, a voltage difference between both ends (the touch sensor and the driving lines) of a parasitic capacitance may exist when the driving voltage of the relatively high level is supplied to the signal lines. Hence, an amount of charges charged to the parasitic capacitance is not zero. As a result, the touch sensitivity may be reduced.

The timing controller 16 supplies a first power control signal to the main power IC 300 and increases the difference between the first gate high voltage Vgh1 and the second gate high voltage Vgh2. Because the first AC signal LFD1 has the amplitude corresponding to the second gate high voltage Vgh2, an amplitude am1 of the first AC signal LFD1 may increase. Because the touch driving signal Vdrv and the second AC signal LFD2 having the same phase and the same amplitude as the first AC signal LFD1 are changed to an increase in the amplitude 'am1' of the first AC signal LFD1, a reduction in the touch sensitivity can be previously prevented.

In FIG. 8, (b) shows the second gate high voltage Vgh2 controlled in response to the power control signal PSS when a touch noise decreases due to an image output during the display driving period Td. A ripple of the common voltage Vcom may exist during specific images, such as images in which the data voltage slightly changes during the display driving period Td. Hence, a touch noise may decrease, and the touch sensitivity and the accuracy of touch recognition may increase. As a result, even if the driving voltage of a relatively low level is supplied to the signal lines, the touch sensitivity and the accuracy of touch recognition may be maintained without a reduction.

When the driving voltage of the relatively low level is supplied to the signal lines, there is little voltage difference between both ends (the touch sensor and the signal lines) of the parasitic capacitance. Hence, an amount of charges charged to the parasitic capacitance is substantially zero. The timing controller 16 supplies a second power control signal to the main power IC 300 and reduces the difference between the first gate high voltage Vgh1 and the second gate high voltage Vgh2. Because the first AC signal LFD1 has the amplitude corresponding to the second gate high voltage Vgh2 that is less than the first gate high voltage Vgh1, an amplitude am2 of the first AC signal LFD1 decreases. Because the touch driving signal Vdrv and the second AC signal LFD2 having the same phase and the same amplitude as the first AC signal LFD1 are changed due to a reduction in the amplitude 'am2' of the first AC signal LFD1, the touch sensitivity can be easily maintained.

As described above, the embodiment of the invention controls the second gate high voltage Vgh2 in response to the power control signal PSS and can maintain the touch sensitivity, which may vary depending on the noise, at a predetermined level.

Figure 9:
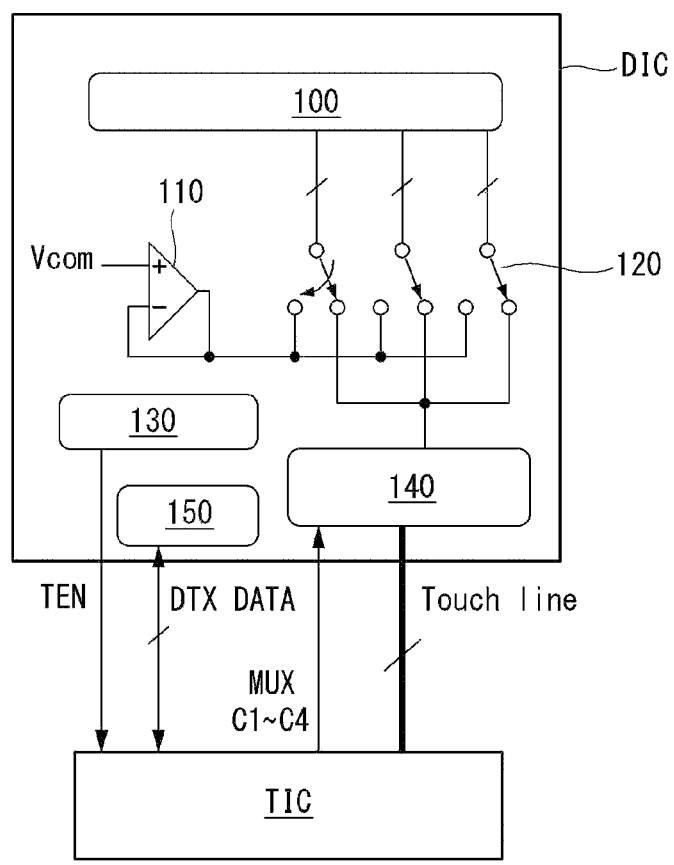
FIGS. 9 to 11 show various examples of a touch driving device according to an exemplary embodiment of the invention.
Figure 10:
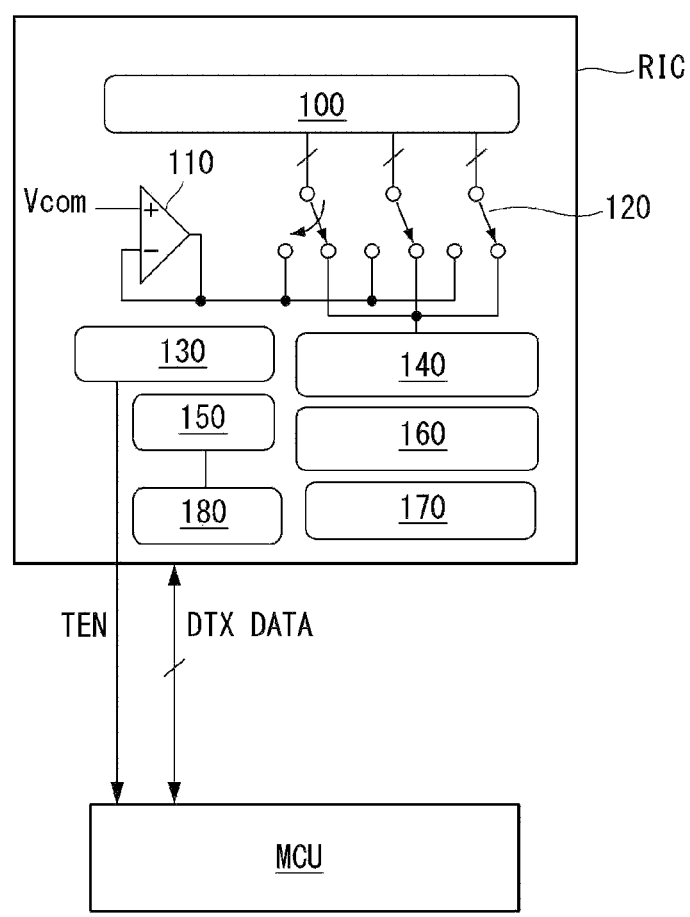
Figure 11:
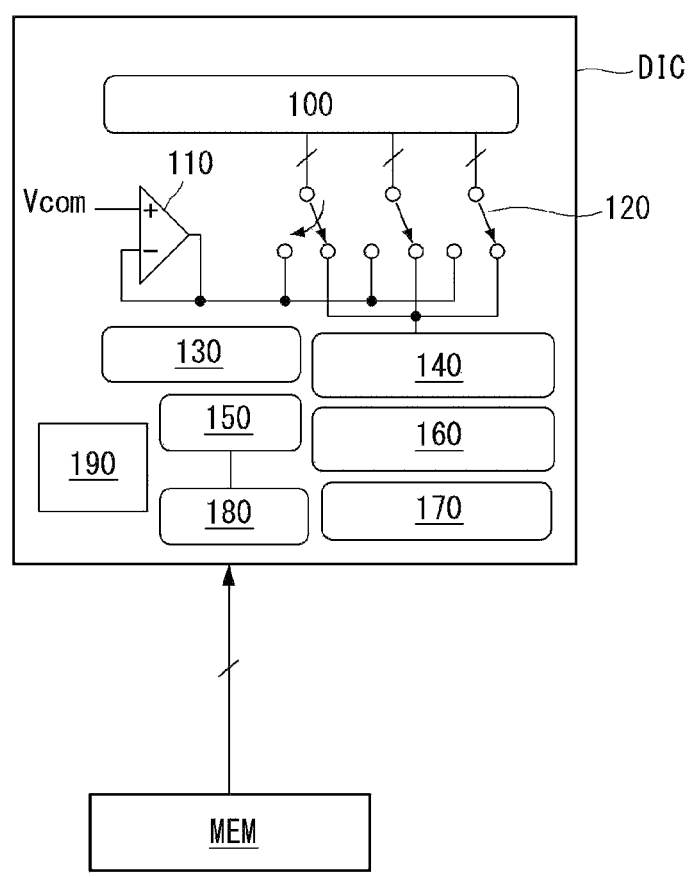

FIGS. 9 to 11 show various examples of the touch driving device 18 according to the embodiment of the invention.

The touch driving device 18 according to the embodiment of the invention may be implemented as an IC package shown in FIGS. 9 to 11.

Referring to FIG. 9, the touch driving device 18 includes a driver IC DIC and a touch sensing IC TIC.

The driver IC DIC includes a touch sensor channel unit 100, a Vcom buffer 110, a switch array 120, a timing control signal generator 130, a multiplexer (MUX) 140, and a DTX compensation unit 150.

The touch sensor channel unit 100 is connected to electrodes of the touch sensors through the sensor lines and is connected to the Vcom buffer 110 and the multiplexer 140 through the switch array 120. The multiplexer 140 connects the sensor lines to the touch sensing IC TIC. In case of a 1-to-3 multiplexer, the multiplexer 140 sequentially connects one channel of the touch sensing IC TIC to the three sensor lines in the time-division manner and thus reduces the number of channels of the touch sensing IC TIC. The multiplexer 140 sequentially selects the sensor lines, which will be connected to the channel of the touch sensing IC TIC, in response to MUX control signals MUXC1 to MUXC3. The multiplexer 140 is connected to the channels of the touch sensing IC TIC through touch lines.

The Vcom buffer 110 outputs the common voltage Vcom of the pixel. The switch array 120 supplies the common voltage Vcom output from the Vcom buffer 110 to the touch sensor channel unit 100 during the display driving period under the control of the timing control signal generator 130. The switch array 120 connects the sensor lines to the touch sensing IC TIC during the touch sensor driving period under the control of the timing control signal generator 130.

The timing control signal generator 130 generates timing control signals for controlling operation timings of the display driver and the touch sensing IC TIC. The display driver includes a data driver 12 for applying data of an input image to the pixels and a gate driver 14. The data driver 12 generates a data voltage and supplies the data voltage to data lines D1 to Dm of the display panel 10. The data driver 12 may be integrated into the driver IC DIC. The gate driver 14 sequentially supplies a gate pulse (or a scan pulse) synchronized with the data voltage to gate lines G1 to Gn of the display panel 10. The gate driver 14 may be disposed on a substrate of the display panel 10 along with the pixels.

The timing control signal generator 130 of the driver IC DIC is substantially the same as a timing control signal generator present in a timing controller 16 shown in FIG. 1. The timing control signal generator 130 drives the display driver during the display driving period and drives the touch sensing IC TIC during the touch sensor driving period.

As shown in FIG. 3, the timing control signal generator 130 produces the touch enable signal TEN defining the display driving period Td and the touch sensor driving period Tt and synchronizes the display driver with the touch sensing IC TIC. The display driver applies data to the pixels during a first level period of the touch enable signal TEN. The touch sensing IC TIC drives the touch sensors in response to a second level of the touch enable signal TEN and senses the touch input. A first level of the touch enable signal TEN may be a high level, and the second level of the touch enable signal TEN may be a low level, or vice versa.

The touch sensing IC TIC is connected to a driving power unit (not shown) and receives driving power. The touch sensing IC TIC produces the touch sensor driving signal in response to the second level of the touch enable signal TEN and applies the touch sensor driving signal to the touch sensors. The touch sensor driving signal may be generated in various pulse shapes including a square wave, a sine wave, a triangle wave, etc. However, it is preferable, but not required, that the touch sensor driving signal is generated in the pulse shape of the square wave. The touch sensor driving signal may be applied to each of the touch sensors N times, so that charges are accumulated on an integrator of the touch sensing IC TIC N or more times, where N is a natural number equal to or greater than 2.

A noise of the touch sensor driving signal may increase depending on changes in data of the input image. The DTX compensation unit 150 analyzes the data of the input image, removes a noise component from touch raw data depending on changes in a gray level of the input image, and transmits it to the touch sensing IC TIC. DTX means Display and Touch crosstalk. The content related to the DTX compensation unit 150 is disclosed in detail in Korean Patent Application No. 10-2012-0149028 (Dec. 19, 2012) corresponding to the present applicant, and which are hereby incorporated by reference in their entirety. In case of a system, in which a noise of the touch sensor does not sensitively change depending on changes in data of the input image, the DTX compensation unit 150 is not necessary and thus may be omitted.

The touch sensing IC TIC drives the multiplexer 140 in response to the touch enable signal TEN from the timing control signal generator 130 during the touch sensor driving period Tt and receives charges of the touch sensors through the multiplexer 140 and the sensor lines.

The touch sensing IC TIC detects a change in charges before and after the touch input from the touch sensor driving signal and compares the change in charges with a predetermined threshold value. The touch sensing IC TIC determines a location of the touch sensors having the change in charges, which is equal to or greater than the threshold value, as an area of the touch input. The touch sensing IC TIC calculates coordinates of each touch input and transmits touch data TDATA(XY) including coordinate information of the touch input to the external host system 19. The touch sensing IC TIC includes an amplifier amplifying charges of the touch sensor, an integrator accumulating charges received from the touch sensor, an analog-to-digital converter (ADC) converting a voltage of the integrator into digital data, and an arithmetic logic unit. The arithmetic logic unit compares touch raw data output from the ADC with the threshold value and determines the touch input based on the result of a comparison. The arithmetic logic unit performs a touch recognition algorithm calculating coordinates.

The driver IC DIC and the touch sensing IC TIC may transmit and receive signals through a serial peripheral interface (SPI).

The host system 19 means a system main body of an electronic device, to which the display device 10 according to the embodiment of the invention is applicable. The host system 19 may be implemented as one of a phone system, a television system, a set-top box, a navigation system, a DVD player, a Blu-ray player, a personal computer (PC), and a home theater system. The host system 19 receives touch input data TDATA(XY) from the touch sensing IC TIC and executes an application associated with the touch input.

Referring to FIG. 10, the touch driving device 18 includes a touch sensor driver RIC DIC and a microcontroller unit (MCU).

The touch sensor driver RIC includes a touch sensor channel unit 100, a Vcom buffer 110, a switch array 120, a first timing control signal generator 130, a multiplexer (MUX) 140, a DTX compensation unit 150, a sensing unit 160, a second timing control signal generator 170, and a memory 180. The touch sensor driver RIC shown in FIG. 10 is different from the touch sensor driver RIC shown in FIG. 9 in that the sensing unit 160 and the second timing control signal generator 170 are integrated inside the touch sensor driver RIC. The first timing control signal generator 130 of FIG. 10 is substantially the same as the timing control signal generator 130 of FIG. 9. Thus, the first timing control signal generator 130 generates timing control signals for controlling operation timings of the display driver and the touch sensing IC TIC.

The multiplexer 140 floats electrodes of the touch sensor accessed by the sensing unit 160 under the control of the MCU. The touch sensor electrodes accessed by the sensing unit 160 are selected by the sensing unit 160 among other touch sensor electrodes except the touch sensor electrodes connected to the pixels charged to the data voltage. The multiplexer 140 may supply the common voltage Vcom under the control of the MCU.

The sensing unit 160 is connected to the sensor lines 115 through the multiplexer 140. The sensing unit 160 measures a change in a waveform of the voltage received from the touch sensor electrodes 22 and converts the change into digital data. The sensing unit 160 includes an amplifier amplifying the received voltages of the touch sensor electrodes 22, an integrator accumulating the amplified voltages of the amplifier, and an analog-to-digital converter (ADC) converting a voltage of the integrator into digital data. The digital data output from the ADC is touch raw data TDATA and is transmitted to the MCU.

The second timing control signal generator 170 generates timing control signals and clocks for controlling operation timings of the multiplexer 140 and the sensing unit 160. The DTX compensation unit 150 may be omitted in the touch sensor driver RIC. The memory 180 temporarily stores the touch raw data TDATA under the control of the second timing control signal generator 170.

The touch sensor driver RIC and the MCU may transmit and receive signals through a serial peripheral interface (SPI). The MCU compares the touch raw data TDATA with a predetermined threshold value and determines a touch input based on the result of a comparison. The MCU performs a touch recognition algorithm calculating coordinates.

Referring to FIG. 11, the touch driving device 18 includes a driver IC DIC and a memory MEM.

The driver IC DIC includes a touch sensor channel unit 100, a Vcom buffer 110, a switch array 120, a first timing control signal generator 130, a multiplexer 140, a DTX compensation unit 150, a sensing unit 160, a second timing control signal generator 170, a memory 180, and a MCU 190. The driver IC DIC shown in FIG. 11 is different from the driver IC DIC shown in FIG. 10 in that the MCU 190 is integrated inside the driver IC DIC. The MCU 190 compares touch raw data TDATA with a predetermined threshold value and determines a touch input based on the result of a comparison. The MCU 190 performs a touch recognition algorithm calculating coordinates.

The memory MEM stores a register setting value related to timing information required in operations of the display driver and the sensing unit 160. When the display device 10 is powered on, the register setting value is loaded from the memory MEM to the first timing control signal generator 130 and the second timing control signal generator 170. The first timing control signal generator 130 and the second timing control signal generator 170 generate timing control signals for controlling the display driver and the sensing unit 160 based on the register setting value read from the memory MEM. The embodiment of the invention can respond to changes in a model of a driving device without change in a structure of the driving device by changing the register setting value of the memory MEM.

As described above, the embodiment of the invention produces the second gate high voltage that less than the first gate high voltage during the touch sensor driving period and thus can increase the amplitude of the touch driving signal. As a result, the embodiment of the invention can improve the touch sensitivity and the accuracy of the touch recognition.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
    a display panel including one or more pixels, touch sensors, and a gate line connected to the one or more pixels, the display panel driven in a display driving period and a touch sensor driving period;
    a gate driver to generate a gate pulse based on a gate high voltage and to supply the gate pulse to the gate line, and
    a power circuit to generate the gate high voltage, the power circuit generating the gate high voltage to have a first voltage level during the display driving period and to have a second voltage level lower than the first voltage level during the touch sensor driving period;
    wherein the gate driver supplies the gate pulse to the gate line during the display driving period and supplies a first signal to the gate line during the touch sensor driving period, and wherein during the touch sensor driving period, a touch driving signal having the same phase and the same amplitude as the first signal is supplied to the touch sensors, and a second signal having the same phase and the same amplitude as the first signal is supplied to data lines connected to the pixels, wherein an amplitude of the first signal has a voltage margin proportional to a difference between the first voltage level and the second voltage level of the gate high voltage.

2. The display device of claim 1, further comprising:
a touch power circuit to produce the first signal such that the amplitude of the first signal corresponds to the second voltage level of the gate high voltage.

3. The display device of claim 2, further comprising:
a pulse width modulation (PWM) generator configured to output first, second and third PWM signals having a same phase, and wherein the touch power circuit produces the touch driving signal having an amplitude corresponding to the second voltage level of the gate high voltage based on the first PWM signal, produces the first signal based on the second PWM signal, and produces the second signal having an amplitude corresponding to the second voltage level of the gate high voltage based on the third PWM signal.

4. The display device of claim 3, wherein the touch power circuit level-shifts the first PWM signal based on a common voltage to produce the touch driving signal, level-shifts the second PWM signal based on the common voltage to produce the first signal, and level-shifts the third PWM signal based on a gate low voltage to produce the second signal.

5. The display device of claim 1, further comprising a timing controller configured to analyze an input image and produce a power control signal depending on an attribute of the input image, wherein the power circuit controls the second voltage level of the gate high voltage in response to the power control signal.

6. A driving circuit for a display device having one or more pixels, touch sensors, and a gate line connected to the one or more pixels, the display device driven in a display driving period and a touch sensor driving period, the driving circuit comprising:
a power circuit to generate a gate high voltage for a gate driver, the gate driver supplying a gate pulse to the gate line based on the gate high voltage; and wherein the power circuit generates the gate high voltage to have a first voltage level during the display driving period and generates the gate high voltage to have a second voltage level lower than the first voltage level during the touch sensor driving period, wherein the gate driver supplies the gate pulse to the gate line during the display driving period and supplies a first signal to the gate line during the touch sensor driving period, and wherein during the touch sensor driving period, a touch driving signal having the same phase and the same amplitude as the first signal is supplied to the touch sensors, and a second signal having the same phase and the same amplitude as the first signal is supplied to data lines connected to the pixels, wherein an amplitude of the first signal has a voltage margin proportional to a difference between the first voltage level and the second voltage level of the gate high voltage.

7. The driving circuit of claim 6, further comprising:
a touch power circuit to produce the first signal such that the amplitude of the first signal corresponds to the second voltage level of the gate high voltage.

8. The driving circuit of claim 7, further comprising:
a pulse width modulation (PWM) generator configured to output first, second and third PWM signals having a same phase, and wherein the touch power circuit produces the touch driving signal having an amplitude corresponding to the second voltage level of the gate high voltage based on the first PWM signal, produces the first signal based on the second PWM signal, and produces the second signal having an amplitude corresponding to the second voltage level of the gate high voltage based on the third PWM signal.

9. The driving circuit of claim 8, wherein the touch power circuit level-shifts the first PWM signal based on a common voltage to produce the touch driving signal, level-shifts the second PWM signal based on the common voltage to produce the first signal, and level-shifts the third PWM signal based on a gate low voltage to produce the second signal.

10. The driving circuit of claim 6, further comprising a timing controller configured to analyze an input image and produce a power control signal depending on an attribute of the input image, wherein the power circuit controls the second voltage level of the gate high voltage in response to the power control signal.

11. A method for driving a display device including a display panel including pixels, touch sensors, and a gate line connected to the one or more pixels, the display panel driven in a display driving period and a touch sensor driving period, the method comprising:
generating a gate pulse at a gate driver based on a gate high voltage and supplying the gate pulse to the gate line during the display driving period;
generating the gate high voltage to have a first voltage level during the display driving period;
generating the gate high voltage to have a second voltage level lower than the first voltage level during the touch sensor driving period;
supplying a first signal to the gate line during the touch sensor driving period;
supplying a touch driving signal having the same phase and the same amplitude as the first signal to the touch sensors during the touch sensor driving period; and
supplying a second signal having the same phase and the same amplitude as the first signal to data lines connected to the pixels during the touch sensor driving period, wherein an amplitude of the first signal has a voltage margin proportional to a difference between the first voltage level and the second voltage level of the gate high voltage.

12. The method of claim 11, further comprising:
producing the first signal such that the amplitude of the first signal corresponds to the second gate high voltage.

13. The method of claim 12, further comprising:
generating first, second and third PWM signals having a same phase;
producing the touch driving signal having an amplitude corresponding to the second voltage level of the gate high voltage based on the first PWM signal;
producing the first signal based on the second PWM signal; and producing the second signal having an amplitude corresponding to the second voltage level of the gate high voltage based on the third PWM signal.

14. The method of claim 13, wherein the touch driving signal is produced by level-shifting the first PWM signal based on a common voltage, the first signal is produced by level-shifting the second PWM signal based on the common voltage, and the second signal is produced by level-shifting the third PWM signal based on a gate low voltage.

15. The method of claim 11, further comprising:
analyzing an input image and producing a power control signal depending on an attribute of the input image; and
controlling the second voltage level of the gate high voltage in response to the power control signal.

* * * * *